United States Patent [19]

Mizote

[11] 4,034,627
[45] July 12, 1977

[54] ELECTRONIC CONTROL DEVICE FOR AN AUTOMATIC POWER TRANSMISSION

[75] Inventor: Masonori Mizote, Yokohama, Japan

[73] Assignee: Nissan Motor Co., Ltd., Yokohama, Japan

[21] Appl. No.: 209,562

[22] Filed: Dec. 20, 1971

[30] Foreign Application Priority Data

Dec. 21, 1970 Japan ............................ 45-114909

[51] Int. Cl.$^2$ ...................................... B60K 41/04
[52] U.S. Cl. ............................... 74/866; 74/752 D
[58] Field of Search .......................... 74/866, 752 D

[56] References Cited

U.S. PATENT DOCUMENTS

| 3,640,156 | 2/1972 | Mori et al. | 74/752 D |
| 3,721,136 | 3/1973 | Irie | 74/752 D |
| 3,727,488 | 4/1973 | Wakamatsu et al. | 74/866 |

Primary Examiner—Samuel Scott
Assistant Examiner—Frank H. McKenzie, Jr.
Attorney, Agent, or Firm—Depaoli & O'Brien

[57] ABSTRACT

An electronic control system for a planetary gear set type automatic power transmission comprising a vehicle speed sensor, sensing means to sense a requirement for downshifting from high to low speed ratio, a synchronizing time interval generating circuit responsive to said vehicle speed sensor and said sensing means for generating a signal to cause the transmission to shift in its lowest and overrunning speed ratio for the duration of said signal thereby to provide a synchronizing time interval, the duration of said signal being longer the higher the vehicle speed is to allow the engine speed to be completely synchronized with the transmission speed for effecting smooth downshifting.

8 Claims, 8 Drawing Figures

TIME

ELECTRONIC CONTROL DEVICE FOR AN AUTOMATIC POWER TRANSMISSION

This invention relates to electronic control devices for an automatic power transmission and, more particularly, to an electronic control device for effecting smooth downshift in the power transmission.

In order to effect smooth downshift in an automatic power transmission having a hydrodynamic torque converter and at least one planetary gear set, it is necessary to synchronize engine revolutions to match the gear reduction ratio of a particular speed to which downshift takes place. In an ordinary automatic power transmission, downshift is effected by holding the planetary gear set in its neutral position for a fixed time interval so that the engine revolutions may be synchronized. This fixed time interval is called the synchronizing time interval, which must be arranged to be longer for a higher vehicle speed and a lower engine torque. If the synchronizing time interval is shorter than an appropriate value a great shock is experienced during downshift operation. If, in contrast, the synchronizing time interval is longer than the appropriate value, an excessive engine racing will take place resulting is unusual mechanical shocks in various parts of the power transmission. Various electronic control devices have heretofore been proposed to provide an appropriate synchronizing time interval during which the transmission is shifted into the neutral position for downshift operation. One of these prior devices is significantly affected by the ambient temperature because of its inherent construction thus providing poor reliability in operation, while the others are extremely sensitive to noise problems occasioned by, for example, an ignition noise of an engine of the motor vehicle and, thus, an inadvertent interval may be caused to affect vehicle operation.

It is, therefore, an object of this invention to provide an electronic control device for an automatic power transmission, which control device is highly reliable in operation.

Another object of this invention is to provide an electronic control device which is less sensitive to noise problems to increase reliability in operation.

A further object of this invention is to provide an electronic control device which is independent of ambient temperature.

Still another object of this invention is to provide an electronic control device which is adapted to produce a synchronizing time interval in accordance with one of varying operational conditions of a motor vehicle.

Still further object of this invention is to provide an electronic control device which is simplified in construction.

Figures 1, 2:
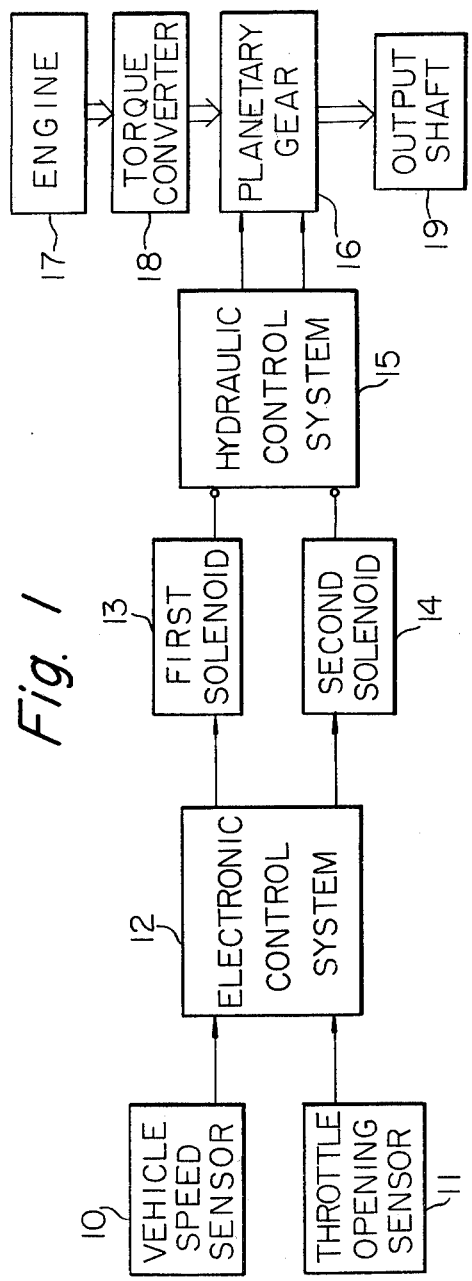
FIG. 1 is a block diagram of an automatic power transmission incorporating an electronic control system including an electronic control device according to this invention.
FIG. 2 is a chart illustrating a relationship between operating conditions of the solenoids used for controlling the automatic power transmission of FIG. 1 and speed ratios to be obtained thereby.

Referring now to FIG. 1, there is schematically shown an automatic power transmission including an electronic control system incorporating an electronic control device according to this invention. In the illustrated embodiment, the automatic power transmission is shown to include a throttle opening sensor 11 and a vehicle speed sensor 10. The throttle opening sensor 11 may be of any known construction and functions to sense the degree of opening of an engine carburetor throttle valve and thereby generating a voltage signal proportional thereto. The vehicle speed sensor 10 may be of any suitable construction insofar as it functions to generate a negative voltage signal in proportion thereto. These voltage signals are supplied to an electronic control system 12 which is arranged to generate output signals in response thereto for effecting shifts of first, second and third input/output shaft speed ratios. It will be appreciated that the present invention is specifically directed to the electronic control device forming a part of the electronic control system 12. The output signals delivered from the electronic control system 12 are supplied to a first solenoid 13 and a second solenoid 14 which cooperate with each other for controlling a hydraulic control system 15. The hydraulic control system 15 includes a plurality of friction elements such as friction clutches and brakes (not shown) which are controlled thereby in accordance with the operating conditions of the first and second solenoids 13 and 14. These friction clutches and brakes control a planetary gear 16 in such a manner as to establish the gear reduction ratios for the first, second and third input/output shaft speed ratios. The output torque of the engine 17, is delivered through a hydrodynamic torque converter 18 to the planetary gear 16 through which it is delivered to an output shaft 19 of the transmission at a required gear reduction ratio under the control of the electronic control system 12. It will be noticed that the description with respect to the reverse drive and manually controlled drive is herein omitted for the sake of simplicity of description.

FIG. 2 illustrates a relationship between the operating conditions of the first and second solenoids and the input/output shaft speed ratios to be obtained thereby. In FIG. 2, the symbol "+" denotes that the solenoid is energized while the symbol "−" denotes that the solenoid is de-energized. It should be noted in this instance that the electronic control device according to this invention may be preferably applicable to an automatic power transmission wherein the first input/output speed ratio is established with an overrunning characteristic to interrupt the drive connection between the engine 17 and the output shaft 19 when the power flow is from the driving wheels (not shown) to the torque converter.

When an accelerator pedal is depressed to increase the effective open area of the throttle valve, to fully open, the electronic control system the automatic power transmission automatically causes to effect downshift from third to second speed ratio. This known as the "kickdown" operation. However, if the downshift is effected under low revolution speed of the engine, the engine 17 is driven by the output shaft 19 of the power transmission with a result that the engine braking action is brought about thus producing a shifting shock. To eliminate this shifting shock, it is required that the synchronizing time interval be developed to increase the engine revolutions between shifts of third and second speed ratios.

As previously noted, the electronic control device of the present invention is applied to control the automatic power transmission wherein first speed ratio is established without causing engine braking action when the power flow is reversed. Thus, it is apparent that the synchronizing condition is obtained during a downshift from third to second speed ratio, by effecting shift of first speed ratio in place of setting the power transmission in its neutral position. Accordingly, the electronic control device of the present invention is described as producing an overrunning period by establishing the first speed ratio.

Figure 3:
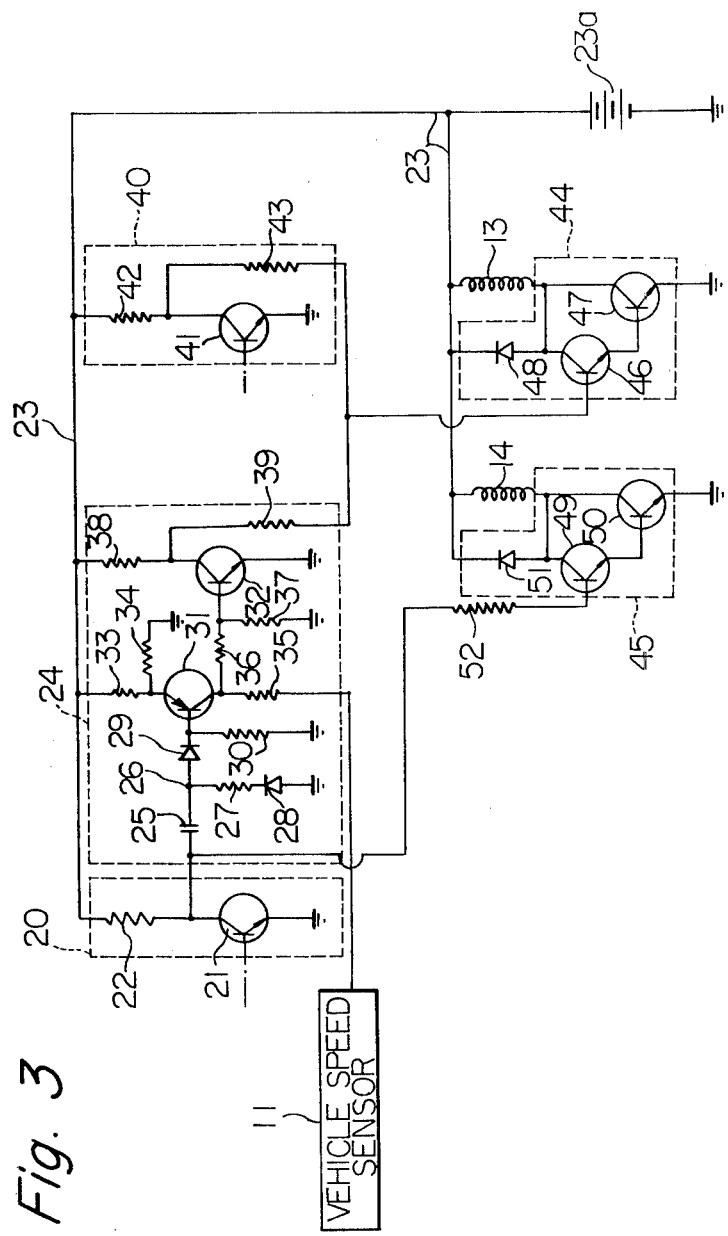
FIG. 3 is a wiring diagram of the electronic control device incorporated in the electronic control system shown in FIG. 1.

A preferred example of the electronic control device implementing this invention is illustrated in FIG. 3. As shown, the electronic control device includes sensing means 20 for sensing a requirement for downshifting. The sensing means 20 includes a transistor 21 and a resistor 22. The transistor 21 has the base connected to a part of the electronic control system of FIG. 1 and responsive to a speed indicating signal delivered therefrom. The emitter of the transistor 21 is grounded, while the collector of the transistor 21 is connected to the resistor 22. The resistor 22 is connected to a bus line 23 of a positive voltage of a d.c. power source 23a. The electronic control device also includes a synchronizing time interval generating circuit 24 which develops a signal for producing a synchronizing time interval generating circuit 24 includes a capacitor 25 which is connected to the collector of the transistor 21 and which capacitor is connected to a junction 26 to which a resistor 27 is also connected. The resistor 27 is connected to a diode 28 which in turn is grounded. The capacitor 25 is also connected through the node 26 to an anode of a diode 29 in which the cathode is grounded by means of a resistor 30. The synchronizing time interval generating circuit 24 also includes first and second transistors 31 and 32. The first transistor 31 is of p-n-p type and is normally rendered conductive. The transistor 31 has the base connected to cathode of the diode 29 and the resistor 30. The emitter of the first transistor 31 is connected through resistor 33 to the bus line 23 and is grounded through a resistor 34. The collector of the first transistor 31 is connected through a resistor 35 to the vehicle speed sensor 10 and through a resistor 36 to the base of the second transistor 32 (which is of n-p-n type), in which the base is also grounded through a resistor 37. The second transistor 32 is normally rendered conductive and has the collector connected through a resistor 38 to the bus line 23 while the emitter is grounded. The collector of the second transistor 32 is also connected to a resistor 39. A command circuit 40 includes a transistor 41 which is responsive to a first speed ratio indicating a signal delivered from the electronic control system 12 (FIG. 1) to its base. The collector of the transistor 41 is connected through a resistor 42 to the bus line 23 and through a resistor 43 to the resistor 39 connected to the collector of the transistor 32.

The electronic control device further includes first and second amplifiers 44 and 45 which amplify voltage signals delivered thereto for energizing first and second solenoids 13 and 14. The first amplifier 44 includes transistors 46 and 47, and a diode 48. The transistor 46 has the base connected to a node (not identified) between the resistors 39 and 43 to receive the voltage signals from the synchronizing time interval generating circuit 24 and the command circuit 40. The collector of the transistor 46 is connected through the diode 48 to the bus line 23. The collector of the transistor 46 is also connected to the collector of the transistor 47, to which the solenoid 13 is connected. The emitter of the first transistor 46 is connected to the base of the transistor 47, the emitter of which is grounded. The second amplifier 45 similarly includes transistors 49 and 50, and a diode 51. The first transistor 49 has the base connected through a resistor 52 to a node (not identified) between the collector of the transistor 21 and the capacitor 25 to receive the voltage signal. The collector of the transistor 49 is connected through the diode 51 to the bus line 23 and is also connected to the collector of the transistor 50, to which the second solenoid 14 is connected. The emitter of the transistor 49 is connected to the base of the transistor 50, the emitter of which is grounded.

It should be noted that transistors 21, 32, 41, 46, 47, 49 and 50 are shown and described as of the n-p-n type, but transistor 31 is of the p-n-p type, as mentioned above. However, this arrangement is an example only and different arrangements may be used within the scope of this invention.

The first speed ratio is normally effected by the electronic control system 12 developing a corresponding signal which is supplied to the base of transistor 41 of the command circuit 40 which in turn supplies an actuating signal to the amplifier 44 to energize the solenoid 13. Since, in this instance, the transistor 21 is cut off, the voltage appearing at the bus line 23 is supplied through the resistors 22 and 52 to the amplifier 45 to energize the solenoid 14, whereby the first speed ratio is established. The second speed ratio is effected by rendering the transistor 21 nonconductive to cause the amplifier 44 to de-energize the solenoid 13, with the solenoid 14 kept energized. The third speed ratio is effected by supplying a third speed ratio indicating signal to the base of the transistor 21 which is accordingly rendered conductive so that the collector voltage goes zero, whereby no voltage is supplied to the amplifier 45. The second solenoid 14 is thus de-energized. In this instance, since the transistor 32 is made conductive, no voltage is supplied to the first amplifier 44 so that the first solenoid 13 is de-energized. The third speed ratio if thus established as seen from FIG. 2.

As already discussed, when the automatic power transmission is operating in its third speed ratio, the third speed indicating signal is supplied to the base of the transistor 21 thereby rendering the transistor 21 conductive. With the transistor 21 being rendered conductive, the voltage appearing at the collector thereof is at grounded potential and, therefore, the second solenoid 14 is de-energized. During this time period, since the first speed indicating signal is not applied to the base of the transistor 41 of the command circuit 40, the transistor 41 is kept conductive. In this condition, the voltage appearing at a node (not identified) between the resistors 42 and 43 is at ground potential and, therefore, the first solenoid 13 is de-energized. Thus, the third speed ratio is maintained in the automatic power transmission as seen from FIG. 2.

When the downshifting signal is applied to the base of the transistor 21, the transistor 21 is rendered nonconductive so that the voltage appearing at the collector thereof is passed through the resistor 52 to the amplifier 45 thereby energizing the second solenoid 14. The voltage appearing at the collector of the transistor 21 is also supplied through the capacitor 25 and the diode 29 to the base of the transistor 31 thereby rendering the same nonconductive. With the transistor 31 being made nonconductive, the voltage appearing at the collector thereof is at negative potential so that the transistor 32 is cut off. Accordingly, the voltage appearing at the bus line 23 is passed through the resistors 38 and 39 to the first amplifier 44 thereby energizing the first solenoid 13. Thus, the first and second solenoids 13 and 14 are simultaneously energized and, therefore, the first speed ratio is established for a time period the length of which is dependent on capacitor 25 and vehicle speed so that the engine revolutions may be synchronized.

Figure 4A:
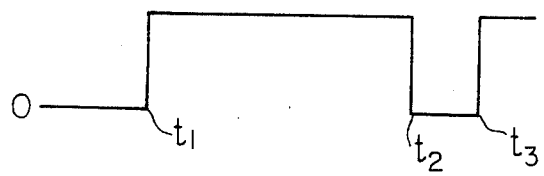
FIGS. 4A-4D are views illustrating voltage wave forms in the circuit of FIG. 3.
Figure 4B:
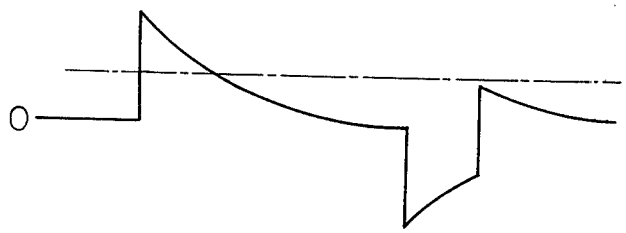
Figure 4C:
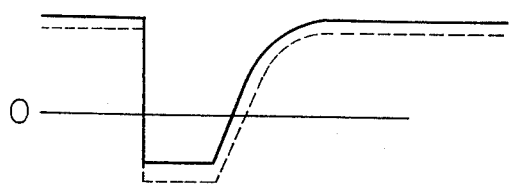
Figure 4D:
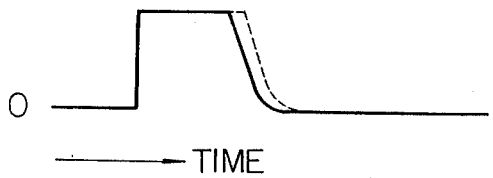

The duration of the synchronizing time interval is more clearly explained with reference to FIG. 4. FIG. 4A illustrates variations of potential at the collector of the transistor 21, the zero potential representing the condition in which the power transmission is operating in its third speed ratio while the positive potential indicates the condition in which the power transmission is operating in its second or first speed ratio. FIG. 4B illustrates variations of the potential at the node 26 shown in FIG. 3. FIG. 4C illustrates variations of potential at the collector of the transistor 31 and FIG. 4D shows variations of potential at the collector of the transistor 32. As previously noted, when the power transmission is constantly operating in its third speed ratio in a time period $t<t_1$, the transistor 21 is conductive so that the potential at the collector thereof is at ground potential as seen in FIG. 4A. In this condition, since the capacitor 25 is not charged, the potential at the node 26 is at zero level (FIG. 4B). This causes the transistor 31 to become conductive. With the transistor 31 being rendered conductive, the potential at the collector thereof is at positive level (FIG. 4C) and, consequently, the transistor 32 is made conductive so that the potential at the collector thereof is at ground level (see FIG. 4D).

The transistor 31 and resistors 33, 34 and 35 cooperate with one another to produce a pulse signal having an utmost low voltage (see FIG. 4C) while the signal at the joint 26 (see FIG. 3) is larger than a predetermined level and gradually increasing in accordance with the exponential decrease of the signal of FIG. 4B after the signal in FIG. 4B lowers below the predetermined level as shown in FIG. 4C. Thus, the circuit elements 31, 33, 34 and 35 constitute a first level detector. It is to be noted that the output signal of the first level detector is shifted in its basic level relative to the earth level in accordance with the magnitude of the vehicle speed signal from the vehicle speed sensor 10. The transistor 32 and the resistors 36, 37 and 38 cooperate with one another so as to produce a time interval signal that lasts while the output signal of the first level detector is larger than another predetermined level. Thus, the circuit elements 32, 36, 37 and 38 constitute a second level detector.

When, on the contrary, the power transmission begins downshifting from third to second speed ratio at a point $t_1$, the transistor 21 is cut off so that the potential at the collector thereof goes positive abruptly (see FIG. 4A). Consequently, the potential at the node 26 is raised to the battery voltage. In this instance, since the capacitor 25 is gradually charged to battery voltage, less the value of resistor 22, the potential at the node 26 progressively approaches the zero level (FIG. 4B). In FIG. 4B, a phantom line indicates the base potential of the transistor 31 when the transistor 31 is conductive. Thus, it is apparent that the transistor 31 is made nonconductive during a time interval $t$ in which the potential at the node 26 is above the level shown by the phantom line in FIG. 4B. This time interval is determined by the products of the resistor 22, capacitor 25, diode 29 and resistor 30 and by the base potential at which the transistor 31 is conductive. When the transistor 31 is cut off, the potential at the collector thereof goes negative to a value which depends on the value of the signal delivered from the vehicle speed sensor 11. After the time interval has passed, the transistor 31 is rendered conductive again as seen from FIG. 4C. In FIG. 4C, the broken line indicates the condition in which the vehicle is running at a higher vehicle speed, that is, the condition in which the negative voltage delivered from the vehicle speed sensor 11 is at higher level. This indicates, that the time during which the negative potential appears at the collector of the transistor 31 is long. When, furthermore, the transistor 31 is cut off, the transistor 32 is also cut off. This transistor 32 will be rendered conductive when the potential at the collector of the transistor 31 reaches a predetermined level. During this time duration, the potential at the collector of the transistor 32 becomes positive (see FIG. 4D) and this voltage is supplied through the resistor 39 to the first amplifier 44 where it is amplified to energize the first solenoid 13. As already discussed, the second solenoid 14 is also energized by the positive potential appearing at the collector of the transistor 21. Thus, the power transmission is set in its first speed ratio (see FIG. 2) during the synchronizing time interval while the engine revolutions may be synchronized. It will thus be seen that the synchronizing time interval is appropriately produced by properly selecting the values of the associated component elements.

Figure 5:
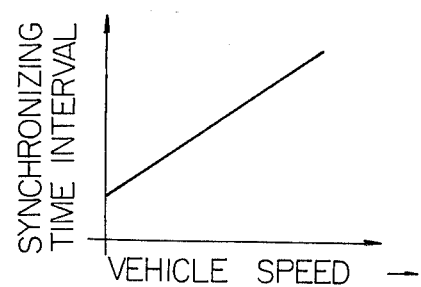
FIG. 5 is a graph showing the relationship between the synchronizing time interval and the vehicle speed.

FIG. 5 shows an example of the relationship between the vehicle speed and the length of the synchronizing time interval.

It will be appreciated from the following description with reference to FIGS. 3 and 4 that the synchronizing time interval will not be produced where the power transmission effects shift to second speed ratio again just after the third speed indicating signal is generated for compensating the delay of hydraulic control system 15. Before entering into detailed description of this function, let it be assumed that the second speed ratio is established at the point $t_3$ in a short space of time after the third speed ratio has been established at the point $t_2$ as seen in FIG. 4A. At the time of shifting into the third speed ratio the voltage charged in the capacitor 25 is discharged through the diode 28, resistor 27 and the transistor 21. Accordingly, the potential at the node 26 goes abruptly negative and then gradually increases to the zero level at a rate that is determined by the products of resistor 27 and the capacitor 25 as shown in FIG. 4B. In the short space of time, if the second speed ratio indicating signal is produced at the point $t_3$, the potential at the node 26 goes positive again. However, this potential is lower than that produced during downshifting at a time at which the third speed ratio has been established for a sufficiently long period. This is because of the fact that the value of variations in potential at the node 26 depends on the value of variations in potential at the collector of the transistor 21. It will be apparent in this instance that the potential at the node 26 does not reach the level to cut off the transistor 31 whereby the synchronizing time interval is not produced.

It will now be understood from the foregoing description that since the transistor 31 is arranged to provide on-off operation within a range in which falling speed of the input voltage to be applied to the base of the transistor 31 is high, the whole device is less sensitive to variations in the ambient temperature.

It will also be seen that since the synchronizing time interval is not produced where the energy of the noise signal is small, the electronic control device embodying this invention is highly reliable in operation thereby to eliminate shifting shocks.

What is claimed is:

1. An electronic control system for a planetary gear set type automatic power transmission having a hydraulic power source, a hydraulic circuitry and hydraulically actuable friction elements to provide a required input/output shaft speed ratio, said control system comprising:
   A. sensing means to sense vehicle speed;
   B. sensing means to sense a requirement for downshifting from the lowest to the second lowest input-/output speed ratio;
   C. electronic control means responsive to said sensing means to generate a synchronizing time interval signal and to shift the transmission into the highest and overrunning input/output shaft speed ratio for the period of the time interval signal, the time interval signal being longer the higher the vehicle speed is in order to allow the engine speed to be completely synchronized with the transmission speed for smooth downshifting comprising:
      1. a capacitor connected to said sensing means to sense a requirement for downshifting,
      2. a diode connected to said capacitor,
      3. a p-n-p transistor connected to its base to said diode,
      4. an n-p-n transistor connected at its base to the collector of said p-n-p transistor and to said sensing means to sense vehicle speed,
      5. a first amplifier connected to the collector of said n-p-n transistor,
      6. a first solenoid energisable by said first amplifier,
      7. a second amplifier connected to said sensing means to sense a requirement for downshifting,
      8. a second solenoid energisable by said second amplifier, and
      9. a d.c. power source, the arrangement being such that when said sensing means to sense a requirement for downshifting sense such requirement, the base of said p-n-p transistor receives a voltage from said d.c. power source through a resistor, said capacitor and said diode rendering said p-n-p transistor nonconductive whereby the voltage at its collector is at negative potential for thereby rendering said n-p-n transistor nonconductive to cause energisation of said first solenoid by said first amplifier, and said second amplifier receiving simultaneously the same voltage as the capacitor to energise the second solenoid, whereby the transmission is shifted to the first speed overrunning ratio for the period of a synchronizing time interval signal, the length of which depends on the characteristics of the capacitor and vehicle speed and is longer the greater the vehicle speed is, and after the time interval signal, both transistors being rendered conductive, causing the first solenoid to be de-energised to effect the downshift; and
   D. sensing means to sense the degree of opening of throttle valve of an engine carburetor, the electronic control system being responsive to said sensing means to sense the degree of opening of a throttle valve and to said sensing means to sense vehicle speed to develop a signal indicating the requirement for the downshifting.

2. An electronic control system according to claim 1, and further comprising a command circuit connected to the first amplifier and responsive to a first speed ratio signal to cause the first amplifier to energise the first solenoid, the second solenoid being energised by the second amplifier receiving an actuating voltage from the d.c. power source through the resistor, whereby the transmission is set in the first speed overrunning ratio for any length of time.

3. An electronic control system according to claim 2, wherein the transmission is set in a second speed ratio by the second amplifier receiving the voltage from the d.c. power source through the resistor to energise the second solenoid.

4. An electronic control system according to claim 3, wherein the transmission is set in a third speed ratio by a third speed ratio signal, which causes both solenoids to be de-energised.

5. In an electric control system for controlling the gear ratio selecting means of an automatic power transmission of a motor vehicle, the improvement comprising:
   A. a downshift detector for generating a downshift pulse signal which lasts while a lower gear ratio is to be established in the automatic power transmission;
   B. a vehicle speed sensor for producing a vehicle speed signal representative of the vehicle speed;
   C. a differentiator for differentiating said downshift signal to produce a differentiated downshift signal;
   D. a first level detector connected to the output terminal of said differentiator, for producing a pulse signal which:
      1. has an utmost low voltage while the differentiated downshift signal exceeds a predetermined level, and
      2. gradually increases in accordance with the exponential decrease of said differentiated downshift signal after said differentiated downshift signal decreases below said predetermined level, the basic level of said pulse signal being shifted in accordance with said vehicle speed signal;
   E. a second level detector connected to the output terminal of said first level detector for producing a synchronizing time interval signal when the output signal of said first level detector exceeds another predetermined level; and
   F. means for energising said gear ratio selecting means so as to permit the gear ratio of the automatic power transmission to shift into the highest and overrunning gear ratio for the period of said time interval signal, the time interval signal lasting the longer the higher the vehicle speed is so as to allow the engine speed to be completely synchronized with the transmission speed for smooth shifting.

6. An electronic control system according to claim 5, in which said differentiator includes:

A. a capacitor having one terminal thereof connected to the output terminal of said downshift detector;
B. a first diode having the anode thereof connected to the other terminal of said capacitor;
C. a first resistor having one terminal thereof connected to the cathode of said first diode and the other terminal thereof grounded; and
D. a series connection of a second diode and a second resistor, which series connection is connected between said other terminal of said capacitor and the ground.

7. An electronic control system according to claim 6, in which said first level detector includes a first transistor having the base thereof connected to said cathode of said first diode, a third resistor delivering a voltage to the emitter of said first transistor, and a fourth resistor connected between the collector of said first transistor and the output terminal of said vehicle speed sensor.

8. An electronic control system according to claim 7, in which said second level detector includes a voltage divider for producing a voltage proportional to the potential of the collector of said first transistor, and an amplifier for producing said time interval signal when the voltage from said voltage divider exceeds a predetermined voltage.

* * * * *